US009275390B1

(12) United States Patent
Barnes et al.

(10) Patent No.: US 9,275,390 B1
(45) Date of Patent: Mar. 1, 2016

(54) SYSTEMS AND METHODS FOR STATE BASED ADVERTISEMENT MESSAGING ACROSS MEDIA TYPES

(75) Inventors: James D. Barnes, Overland Park, KS (US); Sanjay K. Sharma, Olathe, KS (US); Peter H. Distler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1790 days.

(21) Appl. No.: 11/438,540

(22) Filed: May 22, 2006

(51) Int. Cl.
*G06Q 30/00* (2012.01)

(52) U.S. Cl.
CPC .................................. *G06Q 30/00* (2013.01)

(58) Field of Classification Search
USPC ........................................................... 705/14
See application file for complete search history.

(56) References Cited

U.S. PATENT DOCUMENTS

| | | | |
|---|---|---|---|
| 5,636,346 A | 6/1997 | Saxe | |
| 5,761,648 A | 6/1998 | Golden et al. | |
| 5,848,396 A * | 12/1998 | Gerace ............................ | 705/10 |
| 5,848,397 A | 12/1998 | Marsh et al. | |
| 5,918,014 A | 6/1999 | Robinson | |
| 5,918,041 A | 6/1999 | Berstis | |
| 5,933,811 A | 8/1999 | Angles et al. | |
| 5,937,392 A | 8/1999 | Alberts | |
| 5,974,398 A | 10/1999 | Hanson et al. | |
| 6,202,023 B1 | 3/2001 | Hancock et al. | |
| 6,233,566 B1 | 5/2001 | Levine et al. | |
| 6,266,649 B1 | 7/2001 | Linden et al. | |
| 6,286,005 B1 | 9/2001 | Cannon | |
| 6,317,722 B1 | 11/2001 | Jacobi et al. | |
| 6,321,983 B1 | 11/2001 | Katayanagi et al. | |
| 6,332,127 B1 | 12/2001 | Bandera et al. | |
| 6,826,575 B1 | 11/2004 | Waclawski | |
| 6,834,266 B2 | 12/2004 | Kumar et al. | |
| 6,839,680 B1 | 1/2005 | Liu et al. | |
| 6,853,982 B2 | 2/2005 | Smith et al. | |
| 6,910,017 B1 | 6/2005 | Woo et al. | |
| 6,963,867 B2 | 11/2005 | Ford et al. | |
| 6,966,536 B2 | 11/2005 | Enomoto et al. | |
| 6,990,462 B1 | 1/2006 | Wilcox et al. | |
| 7,022,905 B1 | 4/2006 | Hinman et al. | |
| 7,065,532 B2 | 6/2006 | Elder et al. | |
| 7,096,194 B2 | 8/2006 | Johnson | |
| 7,127,313 B2 | 10/2006 | Neri | |

(Continued)

FOREIGN PATENT DOCUMENTS

WO    WO2015038562 A1    3/2015

OTHER PUBLICATIONS

Lightningcast, Inc., "Lightningcast Mobile Video Advertising Solution," May 2, 2005, 14 pgs.

(Continued)

*Primary Examiner* — Alvin L Brown

(57) ABSTRACT

A method is provided for state based advertisement messaging. The method comprises obtaining state information from a state engine, wherein the state information relates to an advertisement that has been displayed in the mobile device. The method also includes selecting an advertisement from a plurality of advertisements, based at least in part on the state information. The method additionally comprises displaying the selected advertisement in the application, and updating the state information for the selected advertisement when the selected advertisement has been displayed in the application.

21 Claims, 8 Drawing Sheets

(56) References Cited

U.S. PATENT DOCUMENTS

| | | |
|---|---|---|
| 7,143,143 B1 | 11/2006 | Thompson |
| 7,251,615 B2 | 7/2007 | Woo |
| 7,284,033 B2 | 10/2007 | Jhanji |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,788,644 B2 | 8/2010 | Koduru et al. |
| 7,801,518 B1 | 9/2010 | Urbanek |
| 7,840,498 B2 | 11/2010 | Frank et al. |
| 7,958,005 B2 | 6/2011 | Dangaltchev |
| 7,974,616 B1 | 7/2011 | Urbanek |
| 8,326,673 B1 | 12/2012 | Biere et al. |
| 8,423,408 B1 | 4/2013 | Barnes et al. |
| 8,442,858 B1 | 5/2013 | Barnes et al. |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1* | 9/2002 | Levin et al. ............ 705/14 |
| 2002/0143630 A1* | 10/2002 | Steinman et al. ............ 705/14 |
| 2002/0152133 A1 | 10/2002 | King et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0028451 A1 | 2/2003 | Ananian |
| 2003/0032409 A1 | 2/2003 | Hutcheson et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0215238 A1 | 9/2005 | Macaluso |
| 2005/0228754 A1 | 10/2005 | Pezzaniti et al. |
| 2005/0245246 A1 | 11/2005 | Munch et al. |
| 2005/0246394 A1 | 11/2005 | Neri |
| 2005/0256759 A1 | 11/2005 | Acharya et al. |
| 2005/0278296 A1 | 12/2005 | Bostwick |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0178932 A1 | 8/2006 | Lang |
| 2006/0178939 A1 | 8/2006 | Loeb et al. |
| 2006/0223495 A1 | 10/2006 | Cassett et al. |
| 2006/0224437 A1 | 10/2006 | Gupta et al. |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2008/0004884 A1 | 1/2008 | Flake et al. |
| 2008/0082412 A1 | 4/2008 | Tallyn et al. |
| 2008/0104637 A1* | 5/2008 | Rodriguez et al. ............ 725/42 |
| 2008/0126515 A1 | 5/2008 | Chambers et al. |
| 2008/0147478 A1 | 6/2008 | Mall et al. |
| 2008/0228583 A1 | 9/2008 | MacDonald et al. |
| 2009/0070129 A1 | 3/2009 | Inbar et al. |
| 2009/0157512 A1 | 6/2009 | King |
| 2009/0222329 A1 | 9/2009 | Ramer et al. |
| 2009/0265245 A1 | 10/2009 | Wright |
| 2009/0271255 A1 | 10/2009 | Utter et al. |
| 2010/0082422 A1 | 4/2010 | Heilig et al. |
| 2010/0082429 A1 | 4/2010 | Samdadiya et al. |
| 2010/0222035 A1 | 9/2010 | Robertson et al. |
| 2011/0082939 A1 | 4/2011 | Montemurro et al. |
| 2011/0131109 A1 | 6/2011 | Pappas et al. |
| 2011/0258049 A1 | 10/2011 | Ramer et al. |
| 2011/0270687 A1 | 11/2011 | Bazaz |
| 2013/0211941 A1 | 8/2013 | Hallowell et al. |
| 2013/0304586 A1 | 11/2013 | Angles et al. |
| 2013/0331027 A1 | 12/2013 | Rose et al. |
| 2014/0278953 A1 | 9/2014 | Ismail et al. |
| 2015/0074204 A1 | 3/2015 | Burcham et al. |

OTHER PUBLICATIONS

Patent Application entitled, "Method and System Using Location History for Targeted Coupon Distribution," by Von K. McConnell, et al., filed May 17, 2000 as U.S. Appl. No. 09/572,282.

Patent Application entitled, "Dynamic Advertising Content Distribution and Placement Systems and Methods," by James D. Barnes, et al., filed Apr. 17, 2006 as U.S. Appl. No. 11/405,195.

Patent Application entitled, "Inventory Management Integrating Subscriber and Targeting Data," by James D. Barnes, et al., filed Jun. 26, 2006 as U.S. Appl. No. 11/474,880.

Patent Application entitled, "Method and System for Providing Custom Background-Downloads," by Geoff S. Martin, et al., filed Nov. 16, 2007 as U.S. Appl. No. 11/280,576.

Restriction Requirement dated Jun. 17, 2008, U.S. Appl. No. 11/405,195, filed Apr. 17 2006, 7 pages.

Office Action dated Nov. 14, 2008, U.S. Appl. No. 11/474,880, filed Jun. 26, 2006, 17 pages.

Office Action dated Aug. 15, 2008, U.S. Appl. No. 11/405,195, filed Apr. 17, 2006, 12 pages.

Patent Application entitled, "Subscriber Data Insertion Into Advertisements Requests," by James D. Barnes, et al., filed Jul. 21, 2006 as U.S. Appl. No. 11/491,387.

Patent Application entitled, "In-Flight Campaign Optimization," by James D. Barnes, et al., filed Nov. 9, 2006 as U.S. Appl. No. 11/558,021.

Patent Application entitled, "Carrier Data Bassed Product Inventory Management and Marketing," by James D. Barnes, et al., filed Dec. 28, 2006 as U.S. Appl. No. 11/617,703.

(56) References Cited

OTHER PUBLICATIONS

Patent Application entitled, "Advertisement Inventory Management," by James D. Barnes, et al., filed Oct. 27, 2008 as U.S. Appl. No. 12/259,187.
Office Action dated Apr. 2, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Office Action dated Jan. 6, 2010, U.S. Appl. No. 11/558,021, filed Nov. 9, 2006, 7 pages.
Patent application entitled "Method and System for Facilitating Determination of Call-Drop Locations in a Wireless Network," filed Sep. 9, 2003, as U.S. Appl. No. 10/658,353.
Patent Application entitled, "Communication Device Usage Event Profiling," by Robert E. Urbanek, filed Jun. 8, 2006 as U.S. Appl. No. 11/449,078.
Patent application entitled "Seamless Retrieval of Non-Standard Items for a Mobile Device," filed May 12, 2006, as U.S. Appl. No. 11/433,301.
Patent application entitled "Mobile-Device-Based Coupon Management Systems and Methods," filed Apr. 13, 2006, as U.S. Appl. No. 11/403,614.
Patent Application entitled, "Behavioral Analysis Engine for Profiling Wireless Subscribers," by James D. Barnes, et al., filed Nov. 8, 2006 as U.S. Appl. No. 11/557,939.
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Office Action dated Feb. 27, 2009, U.S. Appl. No. 11/433,301, filed May 12, 2006, 13 pages.
Notice of Allowance dated Oct. 26, 2009, U.S. Appl. No. 11/433,301, filed May 12, 2006, 7 pages.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.
Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Jun. 29, 2010, U.S. Appl. No. 11/558,021, filed Nov. 9, 2006, 28 pages.
Final Office Action dated Aug. 18, 2010, U.S. Appl. No. 11/474,880, filed Jun. 26, 2006, 20 pages.
Office Action dated Aug. 30, 2010, U.S. Appl. No. 11/557,939, filed Nov. 8, 2006, 52 pages.
Advisory Action dated Sep. 22, 2010, U.S. Appl. No. 11/558,021, filed Nov. 9, 2006, 3 pages.
Final Office Action dated Jan. 13, 2011, U.S. Appl. No. 11/557,939, filed Nov. 8, 2006.
Office Action dated Feb. 8, 2011, U.S. Appl. No. 11/405,195, filed Apr. 17, 2006.
Office Action dated Sep. 30, 2010, U.S. Appl. No. 11/617,703, filed Dec. 28, 2006.
Final Office Action dated Oct. 27, 2010, U.S. Appl. No. 11/405,195, filed Apr. 17, 2006.
Final Office Action dated Nov. 8, 2010, U.S. Appl. No. 11/403,614, filed Apr. 13, 2006.
Examiner's Answer dated Nov. 8, 2010, U.S. Appl. No. 11/491,387, filed Jul. 21, 2006.
Advisory Action dated Aug. 22, 2013, U.S. Appl. No. 11/403,614, filed Apr. 13, 2006.
Office Action dated Oct. 31, 2013, U.S. Appl. No. 11/557,939, filed Nov. 8, 2006.
Office Action dated Feb. 25, 2015, U.S. Appl. No. 11/474,880, filed Jun. 26, 2006.
Final Office Action date Mar. 2, 2015, U.S. Appl. No. 11/557,939, filed Nov. 8, 2006.
Examiner's Answer dated Mar. 12, 2015, U.S. Appl. No. 12/259,187, filed Oct. 27, 2008.
FAIPP Pre-Interview Communication dated Apr. 3, 2015, U.S. Appl. No. 14/150,832, filed Jan. 9, 2014.
Thierer, et al., "Privacy Solutions (Part 2): Adblock Plus," Technology Liberation Front, Sep. 8, 2008, on line at techliberation.com.
Burcham, Robert H., et al., entitled "IP Address Hashing in Advertisement Gateway," filed Jan. 21, 2014, U.S. Appl. No. 14/160,196.
Burcham, Robert H., et al., entitled "Client Mediation and Integration to Advertisement Gateway," filed Jan. 21, 2014, U.S. Appl. No. 14/160,206.
Burcham, Robert H., et al., entitled "Address Modification for Advertisement Mediation," filed Jan. 21, 2014, U.S. Appl. No. 14/160,215.
Burcham, Robert H., et al., entitled "Advertisement Mediation of Supply-Demand Communications," filed Jan. 21, 2014, U.S. Appl. No. 14/160,224.
Delker, Jason R., et al., entitled, "Enhanced Dialer for a Mobile Communication Device," filed Mar. 4, 2015, U.S. Appl. No. 14/639,057.
Ferrante, Piero D., et al., entitled, "System and Method for Subscriber Cluster Synthesis," filed Feb. 11, 2015, U.S. Appl. No. 14/619,689.
Notice of Allowance dated Dec. 6, 2012, U.S. Appl. No. 11/405,195, filed Apr. 17, 2006.
Office Action dated Dec. 3, 2012, U.S. Appl. No. 11/403,614, filed Apr. 13, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Decision on Appeal dated Nov. 18, 2014, U.S. Appl. No. 11/474,880, filed Jun. 26, 2006.
Sterling, Greg, "Google Replacing "Android ID" with"Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developer.android.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?,"http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed Nov. 11, 2014.
Burcham, Robert H., et al., entitled "System and Method for Identifying a Mobile Device with Near Real Time Visualization to Action," filed Sep. 11, 2013, U.S. Appl. No. 14/024,627.
Burcham, Robert H., et al., entitled "System and Method to Generate an Abstract Advertisement Campaign Management and Implement Policy Enforcement," filed Sep. 11, 2013, U.S. Appl. No. 14/024,629.

(56) References Cited

OTHER PUBLICATIONS

Burcham, Robert H., et al., entitled "System and Method to Generate an Abstract Advertisement Campaign Management and Implement Policy Enforcement," filed Sep. 10, 2014, PCT Application Serial No. PCT/US2014/054877.

Burcham, Robert H., et al., entitled "Methods and Systems of Generating a Unique Mobile Device Identifier," filed Aug. 1, 2013, U.S. Appl. No. 13/956,367.

Holmes, Geoffrey A., entitled "Methods and Systems of Collecting and Segmenting Device Sensor Data for Mobile Device Identification," filed Jun. 5, 2013, U.S. Appl. No. 13/911,074.

Belser, John E., et al., entitled "Ad Management Using Ads Cached on a Mobile Electronic Device," filed Jan. 9, 2014, U.S. Appl. No. 14/150,832.

Katzer, Robin D., et al., entitled "Advertisement Dynamic Queue Management," filed Apr. 10, 2014, U.S. Appl. No. 14/250,381.

Burcham, Robert H., et al., entitled "Categorization of Unknown Variables in a Target Information Database," filed Nov. 4, 2014, U.S. Appl. No. 14/532,969.

Bell, Timothy L., et al., entitled "Method for Consumer Profile Consolidation Using Mobile Network Identification," filed Oct. 20, 2014, U.S. Appl. No. 14/518,504.

Arivukkarasu, Anand, et al., entitled "Telecom Services to Support Retail Fuel Stocking Logistics," filed Nov. 12, 2014, U.S. Appl. No. 14/539,715.

Patent Application entitled "Seamless Retrieval of Non-Standard Items for a Mobile Device," by James D. Barnes, et al., filed Jan. 12, 2010, as U.S. Appl. No. 12/686,188.

Advisory Action dated Nov. 15, 2011, U.S. Appl. No. 11/474,880, filed Jun. 26, 2006.

Final Office Action dated Dec. 12, 2011, U.S. Appl. No. 12/259,187, filed Oct. 27, 2008.

Final Office Action dated Dec. 26, 2013, U.S. Appl. No. 11/558,021, filed Nov. 9, 2006.

Advisory Action dated Feb. 20, 2014, U.S. Appl. No. 11/558,021, filed Nov. 9, 2006.

Office Action dated Dec. 6, 2013, U.S. Appl. No. 12/259,187, filed Oct. 27, 2008.

Office Action dated Apr. 6, 2012, U.S. Appl. No. 11/405,195, filed Apr. 17, 2006.

Examiner's Answer dated May 1, 2012, U.S. Appl. No. 11/474,880, filed Jun. 26, 2006.

Advisory Action dated Feb. 29, 2012, U.S. Appl. No. 12/259,187, filed Oct. 27, 2008.

Final Office Action dated Jun. 10, 2013, U.S. Appl. No. 11/403,614, filed Apr. 13, 2006.

Office Action dated Jun. 13, 2013, U.S. Appl. No. 11/558,021, filed Nov. 9, 2006.

Notice of Allowance dated Aug. 1, 2012, U.S. Appl. No. 11/617,703, filed Dec. 28, 2006.

Connelly, Francis J., et al., "The Life Cycle Concept as a Long Term Forecasting Model", Academy of Marketing Journal (pre-1986); pp. 455-464, Summer 1974, 2, 3, ABI/INFORM Global.

Fisher, Marshall, et al., Accurate Retail Testing of Fashion Mechandise: Methodology and Application, Marketing Science, vol. 19, No. 3, pp. 266-278, Summer 2000, ABI/INFORM Global.

Kurawarwala, Abbas A., et al., "Forecasting and Inventory Management of Short Life-Cyle Products", Operations Research, vol. 44, No. 1, Jan.-Feb. 1996, pp. 131-150, INFORMS.

Stratman, Scott, "Allstockedup", Industrial Distribution, vol. 89, No. 11, Nov. 2000, pp. 92-96, ABI/INFORM Global.

Vijayan, Jaikumar, "IBM Service Follows Products After Delivery", Computerworld, vol. 35, No. 28, p. 14, Jul. 9, 2001, ABI/INFORM Global.

Examiner's Answer date Aug. 26, 2014, U.S. Appl. No. 11/558,021, filed Nov. 9, 2006.

Office Action date Aug. 5, 2014, U.S. Appl. No. 11/557,939, filed Nov. 8, 2006.

Final Office Action dated May 27, 2014, U.S. Appl. No. 12/259,187, filed Oct. 27, 2008.

Advisory Action dated Aug. 6, 2014, U.S. Appl. No. 12/259,187, filed Oct. 27, 2008.

Final Office Action dated Aug. 31, 2015, U.S. Appl. No. 11/474,880, filed on Jun. 26, 2006.

FAIPP Pre-Interview Communication dated Sep. 23, 2015, U.S. Appl. No. 13/956,367, filed Aug. 1, 2013.

FAIPP Office Action dated Jul. 2, 2015, U.S. Appl. No. 14/150,832, filed on Jan. 9, 2014.

\* cited by examiner

| Advertiser | Stage 1 | Stage 2 | Stage 3 | Stage 4 |
|---|---|---|---|---|
| Car Mfgr<br><br>700 | Multi-media 1 | Multi-media 1<br>Multi-media 2<br>WAP banner 1 | Directory 1<br>Multi-media 2<br>WAP banner 1<br>WAP banner 2<br>Multi-media 1<br>JAVA 1<br>JAVA 2 | SMS 1<br>MMS 1<br>Game 1<br>Game 2<br>Directory 1 |
| | Display x 3 | Display x 2 | Display x 5 | Display x 2 |
| Soda Brand<br><br>702 | WAP banner 1<br>WAP banner 2 | Multi-media 1<br>JAVA 1<br>JAVA 2 | MMS 1<br>JAVA 3<br>Multi-media 2<br>WAP banner 1 | MMS 1<br>MMS 2<br>Alerts 1 |
| | Display x 5 | Display x 3 | Display x 2 | Display x 3 |
| Food Product/ Restaurant<br><br>704 | Location based 1<br>Location based 2<br>WAP banner 1 | Alert 1<br>WAP banner 2<br>Location based 2 | SMS 1<br>SMS 2<br>Multi-media 1 | Multi-media 2<br>WAP banner 1<br>Search 1<br>WAP banner 3<br>SMS 2 |
| | Display x 4 | Display x 3 | Display x 2 | Display x 4 |

Fig. 7

SYSTEMS AND METHODS FOR STATE BASED ADVERTISEMENT MESSAGING ACROSS MEDIA TYPES

CROSS-REFERENCE TO RELATED APPLICATIONS

This application includes subject matter related to the following applications, each of which is hereby incorporated by reference:

U.S. patent application Ser. No. 11/405,195 filed Apr. 13, 2006, entitled "Dynamic Advertising Content Distribution and Placement Systems and Methods," by James D. Barnes, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertising and marketing executives are constantly focused on reaching customers in new and innovative ways. With the widespread use of wireless communication devices and continuous advances in handset technology, previously untapped new avenues of advertising are becoming readily available. Because of the breadth of varying technology in handsets, the many types of media, and the lack of infrastructure to support advertising in the wireless world (compared to, for example, the internet or television advertising), tools in the form of both software and hardware are needed to efficiently and effectively manage advertising content and campaigns in the new mobile avenues for advertising.

Advertising may take many different forms in a wireless device, including wireless application protocal (WAP) pages, splash screens, multi-media clips, and more. Present limitations in advertising frameworks and the manner in which different media types are managed prevent advertisers from knowing the order in which advertisements are presented to individual subscribers. Moreover, it is difficult for advertisers to coordinate advertisements across media types.

SUMMARY

Systems and methods for state based advertisement messaging across media types are provided. Some method embodiments include obtaining state information from a state engine, wherein the state information relates to an advertisement that has been displayed in the mobile device. The method further includes selecting an advertisement from a plurality of advertisements, based, at least in part, on the state information. The method additionally includes displaying the selected advertisement in the application, and updating the state information for the selected advertisement when the selected advertisement has been displayed in the application.

According to some system embodiments, a system state based advertisement messaging across media types includes a mobile device and an advertisement fulfillment system. Each mobile device comprises a plurality of executable applications that display one or more advertisements of one or more media types in an order, wherein the order is based at least in part on advertising state information. The advertisement fulfillment system includes a first state engine that stores advertising state information for each of the plurality of mobile devices served. The advertisement fulfillment system also includes a campaign execution unit that executes the one or more advertising campaigns by ordering advertisements in a campaign based, at least in part, on advertising state information and conveying the order to the mobile device.

According to some embodiments, a mobile device for state based advertisement messaging is provided. The mobile device includes a state engine that stores state information for the mobile device. The mobile device additionally includes a plurality of executable applications that display a plurality of advertisements to a user in an order, wherein the order is based, at least in part, on state information.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following description, taken in connection with the accompanying drawings, wherein like reference numerals represent like parts.

FIG. 7 is a table illustrating sequences across media types based on state information according to various embodiments of the present disclosure.

DETAILED DESCRIPTION

Figure 1:
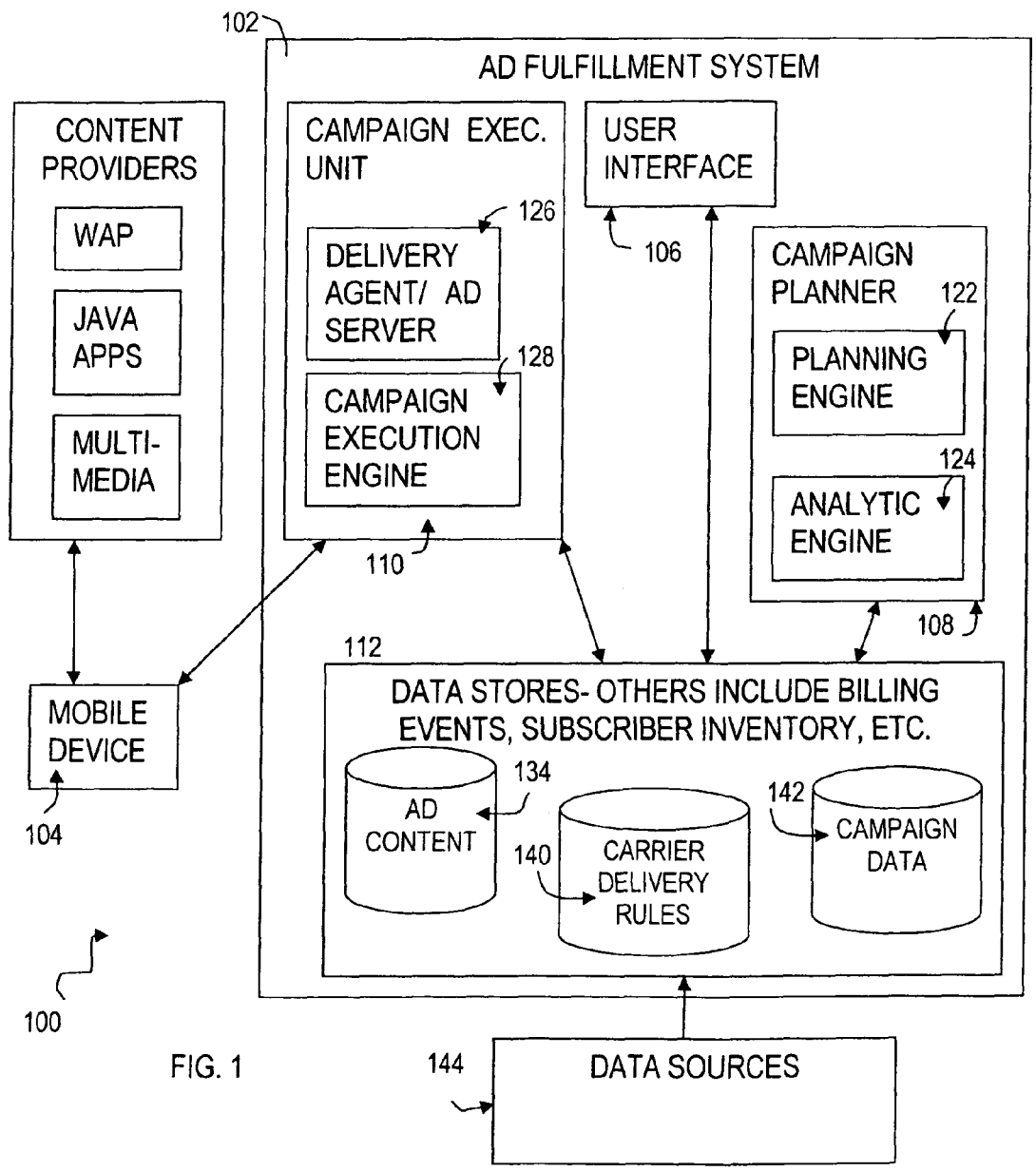
FIG. 1 is a block diagram of a high-level architecture for a system according to various embodiments of the present disclosure.

It should be understood at the outset that although an illustrative implementation of various embodiments is provided below, the present system may be implemented using any number of techniques, whether currently known or not yet in existence. The present disclosure should in no way be limited to the illustrative implementations, drawings, and techniques illustrated below.

With new avenues of advertising available in the mobile device environment, the systems and methods of the present disclosure provide an infrastructure for implementing and managing strategic advertising campaigns involving multiple media types. By maintaining state information regarding the presentation of advertisements to individual subscribers, advertising campaigns may be managed across media types. Maintaining such state information and using it to determine which advertisements to display to individual subscribers permits advertisers to tell a story in sequence, leverage the strengths of different media types, and target campaigns more strategically. State information for a given subscriber may include, for example, which advertisements have been seen, the date and time each advertisement was displayed, how many times each advertisement has been seen, and whether the display of an advertisement resulted in the subscriber acting on the message (such as whether the subscriber clicked on a banner advertisement displayed to him, or responded to an advertisement text message for additional information or to receive a coupon).

Present advertising systems do not have any capability for coordinating advertising across media types. Some advertising systems may sequentially message advertisements within a given media type, but the present advertising systems do not track the behavior of users across media types, or coordinate advertisements to deliver a holistic, themed message across different mediums. The present disclosure provides state based advertising, meaning that the system tracks, on an individual subscriber basis, which advertisements have been served up already, and selects the next advertisement in a given media type based on that state information. The present disclosure further enables confirmation that an advertisement was actually presented to a given subscriber, which is not enabled by all present advertising systems.

The following disclosure is divided into seven sections including this overview. Section II defines terminology used in this disclosure. Section III describes in detail a framework for maintaining state information that provides context and support for the method(s) and applications disclosed in the remaining sections.

As used herein, the term "carrier" refers to a telecommunications company that provides communication services for a mobile device under a subscriber agreement.

As used herein, the term "publisher" refers to the companies that provide the mechanism to display advertisements. For example, a publisher could be a wireless application protocol (WAP) publisher, a multi-media publisher, or a JAVA application publisher. Specifically, publishers are content providers.

As used herein, the term "pricing" refers to the process of rating advertisements to determine the price of running a given advertisement at a particular time, in a particular application, and the like.

As used herein, the term "impressions" refers to the number of instances that any given advertisement has been displayed, or is desired to be displayed by the mobile device.

As used herein, the term "spots" refers to an available instance in an application, splash screen or white space in which an advertisement may be displayed. A spot, in this context of advertising in a mobile device, is analogous to the use of the term "spot" to refer to an available instance for a commercial on television or radio between major programs. Just as "spots" may be sold for advertising on television during the a sporting event such as the Superbowl or during a popular program, spots may be sold for advertising in applications, white spaces, and splash screens in a mobile device.

As used herein, the term "targeting information" refers to input criteria that identify an individual or group of individual mobile device users that are to be targeted in an advertising campaign.

As used herein, the term "media type" refers to how, technologically, a given advertisement is displayed. For example, the media type may indicate whether a given advertisement is displayed via a WAP page or splash screen, through a multimedia player, embedded within a java application or game, or sent in a text message or voice message.

As used herein, the term "category" refers to the types of products or services being advertised in a given advertisement (e.g., travel, groceries, sports & outdoors, name brand consumer goods, etc.).

As used herein, the term "inventory" refers to the overall quantity and identity of spots available for sale for display of advertising.

Various different media types may be used for advertising in mobile devices. For instance, WAP pages are a media type similar to internet web pages, but formatted in WAP, a protocol created for mobile devices such as personal digital assistants (PDAs) and mobile phones, designed to give users a richer data application experience to enable "access to the Internet" through mobile devices. WAP pages may be the source of advertising inventory in the sense that ad banners or ad text may be added to web pages. Such ad banners or texts may, in various embodiments, be interactive (e.g., click-to-call, click-to-coupon, click-to-url, etc.).

Short Message System ("SMS") is a service available on most digital mobile phones that permits the sending of short messages (also known as text messages, messages, or more colloquially SMSes, texts or even txts) between mobile phones, other handheld devices. SMS messages may be employed for advertising. SMS messages represent a push technology instead of pull technology such as WAP pages, since messages can be pushed to a mobile device without subscriber initiation. SMS messages may be used to selectively push advertisements, or alternatively, they could be used as a result of a subscriber interaction with an advertisement elsewhere (such as, for example, when the user clicks on a banner advertisement to register for a contest, an SMS message could be pushed to send an entry notification to the user).

Multimedia content may be still another source of advertising inventory. Multimedia content includes content that is played on a media player on the handset, similar to playing audio/video using Microsoft Media Player or Apple's Quick-Time Pro on a computer. Multimedia content may be either "on demand" or "live content." In on demand content, a video clip of a predetermined length is played. In the case of on demand content, an advertisement may be played before the requested clip (pre-roll), during the requested clip, or after the requested clip (post-roll). In the case of live content, the content is streamed and plays as long as the user permits the media player to play it. Similar to regular television, advertisements may be inserted into the stream. In various embodiments, there are both national and local ad spots.

Searches, as a subset of WAP pages, comprise still another source of advertising inventory in the sense that a user may enter keywords in a search, and the keywords may be utilized in targeting advertisements. For instance, if a user entered into a search the keywords "bed frames," advertisements for local mattress stores may be triggered based on context. Search engines enable contextual targeting with the user of the mobile device providing in the search string things of interest to her.

A directory application may provide additional advertising inventory in the sense that a directory is a subset of JAVA applications, and advertisements may be served up in any type of JAVA application. In a type of directory JAVA that gives directions, advertisements relevant to locations along the direction route may be placed in the application along with the directions. Similarly advertisements may be displayed in a web page application providing directory assistance.

Location based services ("LBS") and applications may be additional advertising inventory in the sense that in java applications, a particular advertisements may be served up in response to a determination of the location of the mobile device.

Start-up/shut-down of J2ME applications may be advertising inventory in the sense that they offer additional locations within a JAVA application where advertisements may be placed. In addition to placing advertisements at the startup and shutdown of a java application, advertisements may be embedded within an application itself as it runs on the mobile device. For example, in an application for a race car game, an advertisement may be displayed in a road sign graphic in the game or at the bottom of a game where white space is available next to the score, the timer, etc.

FIG. 1 is a block diagram of a high-level architecture for a system 100 for advertising management. Embodiments of this architecture are described in more detail in related U.S. patent application Ser. No. 11/405,195, filed Apr. 13, 2006, entitled "Dynamic Advertising Content Distribution and Placement Systems and Methods," by James D. Barnes, et al. The system 100 generally encompasses the advertisement fulfillment system 102 of a carrier and a mobile device 104 associated with the carrier. The mobile device 104 will be described in greater detail below with respect to FIG. 3. Typically, a mobile device 104 will be associated with a particular carrier with whom the user has contracted as a subscriber for services.

Generally speaking, the advertisement fulfillment system 102 comprises a user interface 106, a campaign planner 108, a campaign execution unit 110, and shared data stores 112. The user interface 106 interfaces with the various users including, for example, advertisement agencies, publishers, and the carrier for the advertisement fulfillment system. Through the user interface 106, advertisement agencies may create advertising campaigns, supply advertisements, view the inventory, and view reports. Through the user interface 106, publishers may add inventory, receive advertisement Application Program Interfaces ("APIs") and view reports. Similarly, through the user interface 106, the carrier may rate and price advertisements, generate delivery rules for advertisements, validate the advertisements, and view reports.

The campaign planner 108 comprises various engines, which may be implemented in hardware, software, or a combination of hardware and software. Specifically, the campaign planner 108 comprises, among other engines, a planning engine 122, and an analytics engine 124. The campaign planner 108 is operably linked to the shared data stores 112 such that data in the various shared data stores 112 may be utilized by the planning engine 122, and the analytics engine 124.

The planning engine 122 is the primary component of the campaign planner 108. The planning engine 122 interfaces between the other components to facilitate the campaign definition process. The planning engine 122 supports the various users as described above, namely the advertisement agency, publisher, and carrier. The functionality provided by the planning engine 122 for each of these users is discussed in turn below.

For the advertisement agency user, the planning engine 122 facilitates advertisement and campaign management by enabling the advertisement agency user to add, view, update, and delete advertisements. The planning engine 122 also provides campaign lifecycle management by enabling the advertisement agency user to define, view, update, delete, start, and stop campaigns. A campaign definition defined by the advertisement agency user with the planning engine 122 may, in various embodiments, include the following criteria: the campaign start date, the campaign end date, a number of impressions, a number of subscribers targeted by the campaign, advertisements, spots, a mapping of each advertisement to a spot, cross-media coordination or sequencing, targeting criteria, and pricing. In various embodiments, the targeting criteria may include, for example, demographic data such as age, gender, marital status, income level, whether the user has children, and educational level. The targeting criteria may further include behavioral categories (i.e., sports, music, or travel preferences), or location of the subscriber (based on the subscriber zip code or a global positioning system ((GPS)) location). Alternatively, the targeting criteria may include search keywords. In various embodiments, the planning engine 122 supports the dynamic addition and deletion of targeting criteria such as those described herein.

The advertisement agency user can input a subset of the campaign information (i.e., targeting criteria) listed above and the analytics engine 124 may generate the remainder of the criteria necessary to meet the criteria that was specified. In various embodiments, the advertisement agency user may vary any of the above targeting criteria, and as a result, the analytics engine 124 recommends values for the non-varied criteria.

For the publisher user, the planning engine 122 enables spot definition (i.e., a media type and category for each spot, or available time for advertising), and enables the publisher user to manually specify available inventory over different timeframes (i.e., inventory available per day, month, and the like). The planning engine 122 also enables the publisher user to obtain the executable code (such as WAP or JAVA instructions) used to insert advertisements into available spots. The planning engine 122 further facilitates the user put in place advertisement restrictions (i.e., competitive exclusion).

For the carrier user, the planning engine 122 provides the ability to define carrier rules (including global rules). Carrier rules may include, for example, frequency capping, advertisement restrictions (competitive exclusion, language), and campaign weighting and priority. The planning engine 122 further provides the carrier user with the ability to manually overwrite or set the campaign priority (i.e., define which advertisements within a campaign have higher priority and should be displayed first), and define pricing rules. The planning engine 122 additionally provides the carrier user the ability to validate advertisement content, and the ability to start and stop campaigns. For all three types of user, the planning engine 122 is further operable to generate reports with respect to each of the functionalities described above.

The planning engine 122 interfaces with the analytics engine 124 (which will be further described herein below) to specify the targeting criteria for the campaign and review the resulting subscriber-base matches the targeting criteria. The planning engine 122 may also use the analytics engine 124 to model campaigns for campaign planning. The planning engine 122 may also use the analytics engine 124 to obtain targeting criteria to which a user can strategically target advertisements. The planning engine 122 uses the analytics engine 124 to determine the capacity of inventory available for advertisement placement as a result of the targeted subscriber base determined by the analytics engine 124 and the spots being requested.

The analytics engine 124 is the "brain" of the advertisement fulfillment system 102. The analytics engine 124 contains the data and intelligence to enable planning and execution of campaigns that meet the requirements needed to target highly relevant advertisements to subscribers.

The campaign execution unit 110 comprises various components, which may be implemented in hardware, software, or a combination of hardware and software. The campaign execution unit 110 is responsible for delivering advertisements to mobile devices 104. In the present illustrative framework, there are two types of advertisement delivery by the campaign execution unit 110: pull advertisements and pushed advertisements. In the case of pull advertisements, the user of the mobile device 104 accesses the internet or a particular application and advertisements appear in the mobile device 104 as a result of this activity. In the case of push advertisements, initiating display of the advertisement requires no initiative or activity by the user (e.g., an unsolicited Short Message Service "SMS" message). Specifically, the campaign execution unit 110 comprises a delivery agent/advertisement server 126, a campaign execution engine 128, and other components that are not relevant here. In some embodiments, the campaign execution unit 110 comprises a state engine which will be discussed further below with respect to FIG. 2. (By comparison, the state engine may also be located on the client side, within the mobile device 104, as will be discussed further below with respect to FIG. 3). The campaign execution unit 110 is operably linked to the shared data stores 112 such that data in the various shared data stores 112 may be utilized by the components of the campaign execution unit 110.

The delivery agent/advertisement server 126 generally receives advertisement requests (in case of pull ads) from a client-based or server-based application, requests an advertisement from the campaign execution engine 128, and responds with an advertisement to be served. In case of push advertisements, the delivery agent/advertisement server 126 receives the advertisement content from the campaign execution engine 128 and sends the content to the mobile device 104. The delivery agent/advertisement server 126 uses the specific protocols necessary for receiving advertisement requests and delivering advertisements. In various embodiments, the primary protocol used for receiving advertisement requests and delivering advertisements is hypertext transfer protocol (HTTP).

The campaign execution engine 128 executes advertisement campaigns defined and activated with the campaign planner 108. The campaign execution engine 128 serves the advertisements for a given campaign upon receiving the advertisement requests (in case of pull ads). Upon receiving an advertisement request from the delivery agent/advertisement server 126 (in case of pull ads), the campaign execution engine 128 determines the appropriate advertisement to be served based on complex rules and parameters, including, in various embodiments, state information. In various embodiments, additional criteria involved in determining the correct advertisement may include:
- subscriber data (based on behavioral or demographic targeting),
- campaign weighting (i.e., bid pricing, actual impressions delivered vs. planned impressions),
- advertisement weighting and carrier delivery rules (e.g., frequency capping, advertisement placement restrictions),
- publisher requirements (i.e., different advertisements for different publishers and different spots),
- publisher content type (i.e., type of media being published such as WAP, multimedia, and the like),
- time of day,
- location of the subscriber (in various embodiments, location is passed to the advertisement management system from the publisher, for example, subscriber zip code, or carrier, for example, GPS defined location), and
- contextual (e.g., the advertisement is selected as a result of what the user of the device is doing, such as performing a search with keywords. The context of keywords, defined as part of campaign, or a keyword passed to the advertisement management system from the publisher can be used to push related advertisements).

The campaign execution engine 128 receives some or all of the following information when an advertisement is requested: the subscriber identifier for the mobile device 104, the state information for the subscriber, the publisher (i.e., spot id), the content type, the location, and one or more keywords. The campaign execution engine 128 uses this information to determine the set of campaigns that are associated with the request, accomplished by looking for campaigns associated with the subscriber identifier and the spot identifier of the request.

In various embodiments, the campaign execution engine 128 utilizes a set of global delivery rules (which may or may not be hard coded) to make the decision on which campaign and advertisement to serve to the mobile device 104. The global rules may be defined by the carrier using the carrier user interface 106 of the advertisement fulfillment system 102. In various embodiments, decision making based on the global rules is accomplished in a timely manner (such as, for example, in less than 200 msec) to keep the overall latency of advertisement serving to the subscriber to a minimum.

The shared data stores 112 comprise various databases, including an advertisement content store 134, a carrier delivery rules store 140, and a campaign data store 142. The shared data stores 112 may be accessed by multiple components, though individual components (such as the campaign execution engine 128 or the state engine 132, 133) may additionally have a designated data store that is not shown in FIGS. 1 and 2. The advertisement content store 134 may store the entire stock of advertisements that may be managed by the advertisement fulfillment system 102, and, in some embodiments, transferred over to storage in an advertisements store 202 (FIG. 3) local to a mobile device 104. The carrier delivery rules store 140 stores rules relating to campaigns or particular advertisements or types of advertisements pertaining to how and when advertisements may be displayed. For example, a carrier rule may impose restrictions on frequency of advertisement display, advertisement restrictions such as competitive exclusion or language, and campaign weighting and priority. The campaign data store 142 stores data relating to campaigns, including, for example, targeting information, progress in a campaign, impression counts for specific advertisements, duration of the campaign, and the like. The shared data stores 112 are populated by various data sources 144. The data sources 144 may include, for example, subscriber provided data, internal consumer information maintained by the carrier, external consumer information maintained by third parties, and billing systems.

Figure 3:
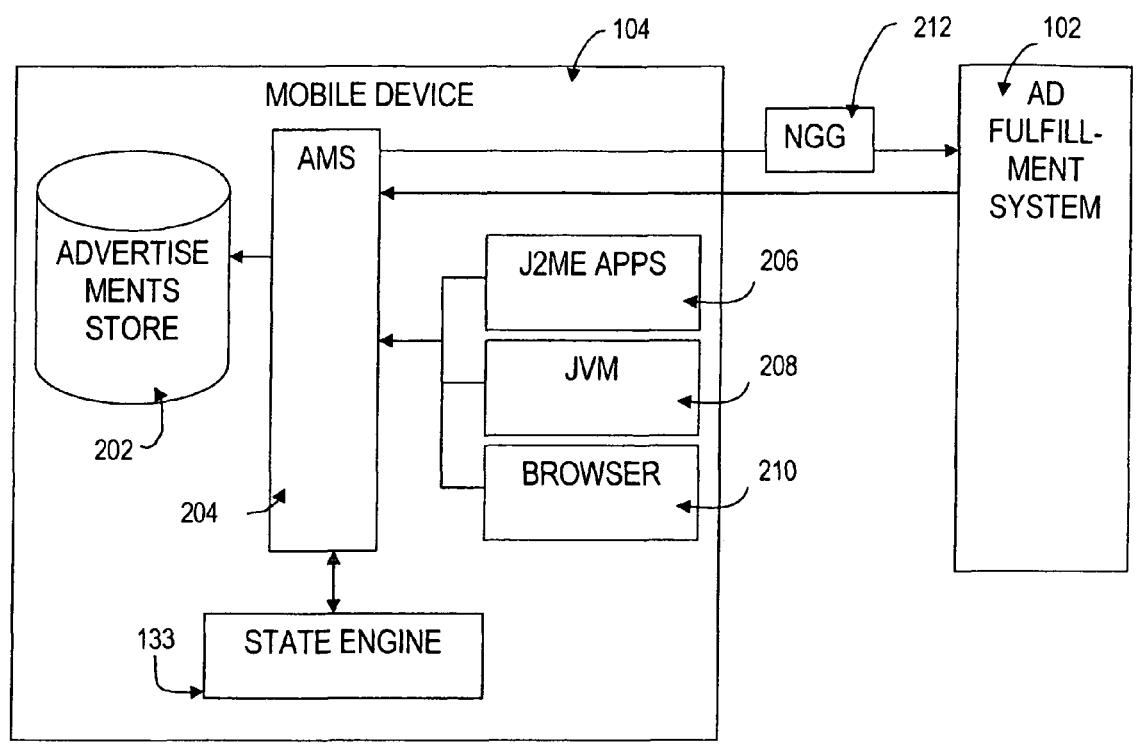
FIG. 3 is a more detailed block diagram of an embodiment of the mobile device having a client side state engine.

A block diagram of an illustrative mobile device 104, as it interacts with the advertisement fulfillment system 102 is shown in FIG. 3. In various embodiments, the mobile device 104 comprises a cellular or wireless telephone, personal digital assistant ("PDA"), handheld computer, or the like operable as a mobile communication device when used in conjunction with telecommunication services provided by a carrier. In some embodiments, the mobile device 104 may comprise, in addition to its basic functionality for communication, various J2ME applications 206, a Java Virtual Machine ("JVM") 208, and a browser 210.

The mobile device 104 may optionally comprise an advertisements store 202 and an advertisement management system 204. In such embodiments, the advertisements store 202 stores at least a set of advertisements locally in the mobile device 104, and the advertisement management system 204 manages display of these advertisements stored locally in the advertisements store 204, functioning at least in part as a localized, less complex version of the advertisement fulfillment system 102. The advertisement management system 204 and advertisements store 202 are disclosed in further detail in related U.S. patent application Ser. No. 11/405,195, filed Apr. 13, 2006, entitled "Dynamic Advertising Content Distribution and Placement Systems and Methods," by James D. Barnes, et al.

For various media types, it may be preferable to store advertisements locally for less latency in accessing and displaying them. For example, for an advertisement spot available during execution of a Java application, the spot may be available for such a fleeting period of time as to make it impractical to retrieve the advertisements from the advertisement fulfillment system 102 each time the spot is displayed, and thus local storage, with faster access, is a solution. Advertisements for filling such spots with lower latency may be optionally stored in the advertisements store 202 and displayed by the advertisement management system 204 instead of retrieved from the advertisement fulfillment system 102 each time the spot is available.

Not all types of advertisements necessitate local storage on the mobile device 104. Alternatively, advertisements may be stored in the advertisement fulfillment system 102 and conveyed to the mobile device 104 for display in applications such as, for example, the browser 210. For example, the browser 210 must retrieve WAP content from the publisher regardless of whether advertisements are shown, so that negligible additional latency is added by retrieval of an advertisement from the advertisement fulfillment system 102.

For each advertisement to be displayed in an application or browser of the mobile device 104, the following may be stored either in the advertisement fulfillment system 102 or the advertisements store 202 in the mobile device 104: a name of the advertisement, the content of the advertisement (which in various embodiments comprises a banner style of ad), an expiration date and time, and in an impressions field, a number of impressions (i.e., number of times that the particular advertisement will be displayed before deletion).

Figure 2:
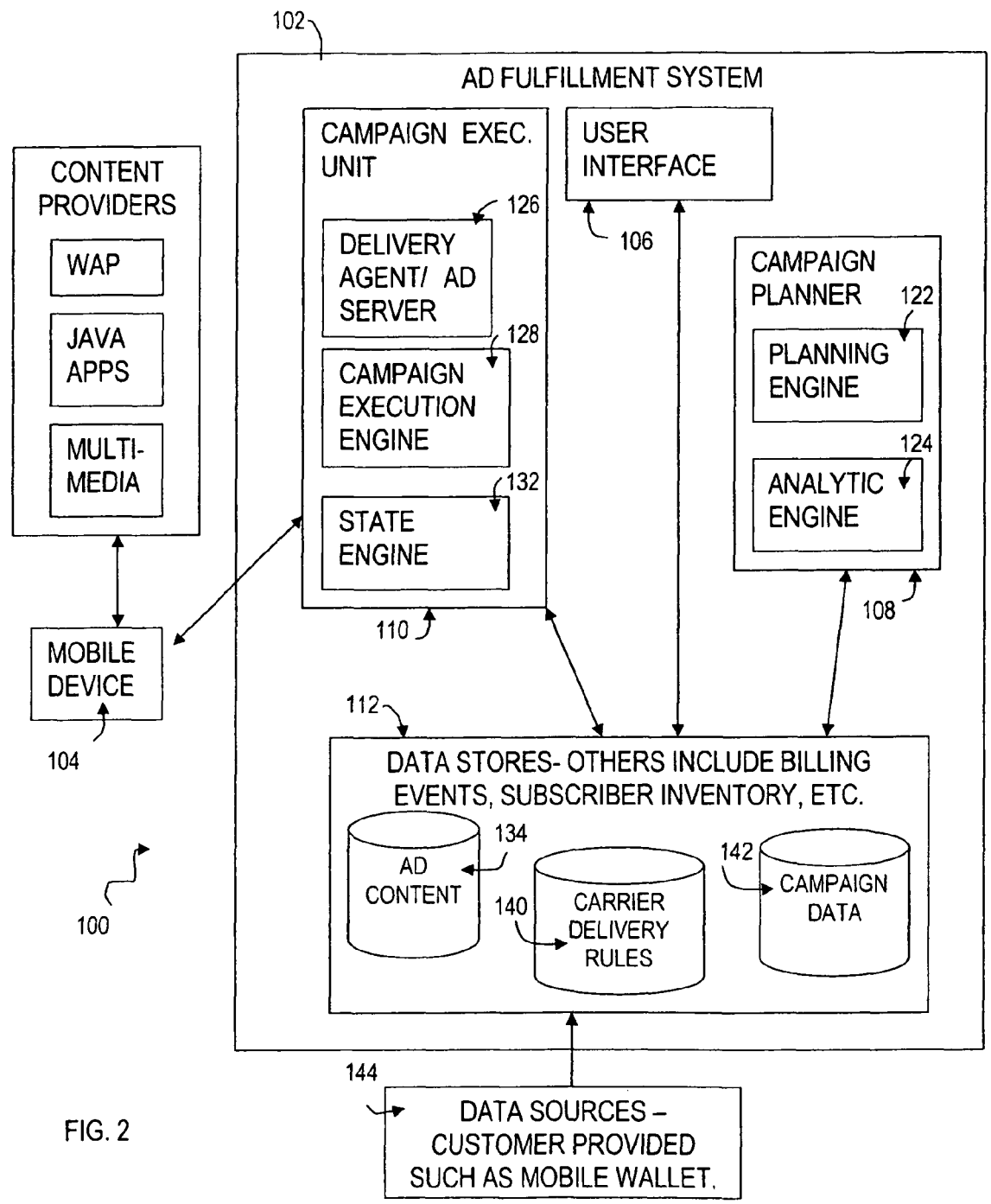
FIG. 2 is a block diagram of a high-level architecture for a system having a server side state engine according to various embodiments of the present disclosure.

As mentioned previously, the present disclosure implements a state engine. The state engine may be located server-side as a first state engine 132 of the campaign execution unit 110 of the ad fulfillment system 102, as shown in FIG. 2, and additionally may optionally be mirrored client-side as a second state engine 133 of the mobile device 104, as shown in FIG. 3. When state information is maintained both client-side and server-side, the state information may be synchronized, either on-demand by the client or server, at regular intervals, after a pre-determined number of advertisement impressions, or the like.

Complete state information may include, for example, a history of each advertisement displayed to a given subscriber, including the date and time, how many times an advertisement has been displayed to the given subscriber, and a log of any action taken by the subscriber in response to the advertisement being displayed. In various embodiments, the complete state information includes a log of how the advertisement was presented to the subscriber, e.g., which spot.

In contrast, current state information may include a set of advertisements available for presentation in a current stage of a campaign, and may include a history of advertisements presented in the current stage of the campaign. In some embodiments, the client-side state engine stores only the current state information or a subset of the state information that pertains to advertising materials presented by the mobile device. The current state information is maintained on a short term, or medium term, basis in the mobile device before it is transferred to the server-side to update the complete state information with the most recent current state information. The mobile device 104 passes current state information to update and synchronize with the complete state information stored in the advertisement fulfillment system 102.

In the first state engine 132 located server-side (as shown in FIG. 2), the first state engine stores complete state information for the subscribers served by the server advertisement fulfillment system 102, and specifically, for all subscribers to whom campaigns are directed by the server advertisement fulfillment system 102. When a request from a mobile device for a messaged advertisement is received by the advertisement fulfillment system 102, the advertisement fulfillment system 102 checks the first state engine 132 for complete state information to determine which advertisement to return to the requesting mobile device 104 The advertisement fulfillment system 102 then updates the first state engine 132 when the selected advertisement has been displayed.

In the second state engine 133 storing state information client-side (as shown in FIG. 3), the second state engine 133 interfaces directly with the advertisement management system 204 to display the advertisements and synchronizes with the first state engine 132 located server-side. The advertisement management system 204 retrieves the current state information from the second state engine 133 to determine which advertisement to display. The advertisement management system 204 updates the second state engine 133 when an advertisement has been displayed in the mobile device 104. At some point in time, the advertisement management system 204 synchronizes the current state information in the second state engine 133 with the complete state information in the first state engine 132.

Figure 4:
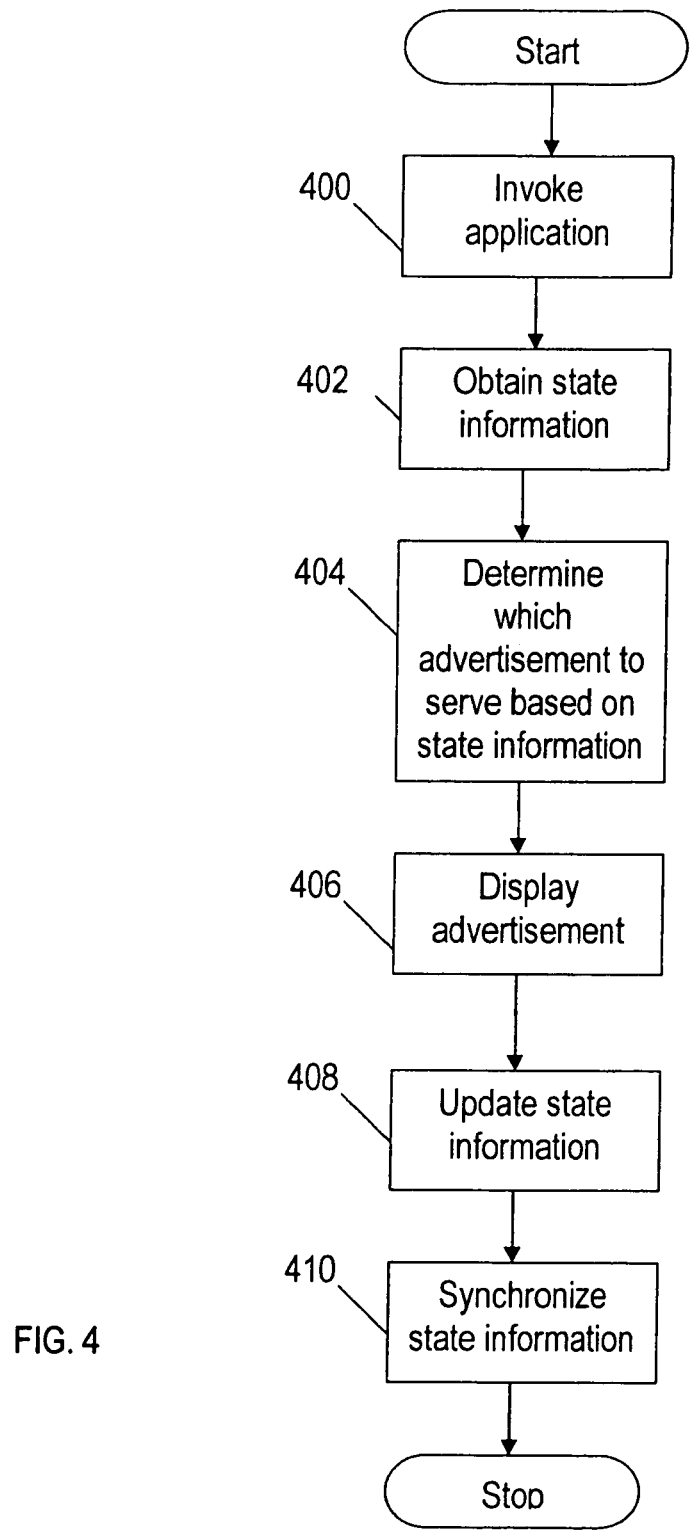
FIG. 4 is a flowchart of a method for serving advertisements in sequence based on state information according to various embodiments of the present disclosure.

Referring now to FIG. 4, a flowchart is shown of a method for serving advertisements in sequence based on state information. The method begins by invoking an application (block 400). Invoking an application may be some action by the subscriber, such as, for example, turning on the mobile device, opening the browser or an application such as a game or the directory, or playing a multimedia clip. The state information is obtained from the state engine regardless of whether the state information is stored client-side or server-side (block 402). The state information is used to determine which advertisement to display according to rules based on what advertisements have already been displayed and/or the response of the subscriber to one or more previously displayed advertisements (block 404). Then the advertisement is displayed (block 406). Finally, the state information is updated once the advertisement has been displayed (block 408). In an optional step, the state information in the first state engine and the second state engine are synchronized in order to mirror the state information on both the client-side and the server-side (block 410).

Figure 5:
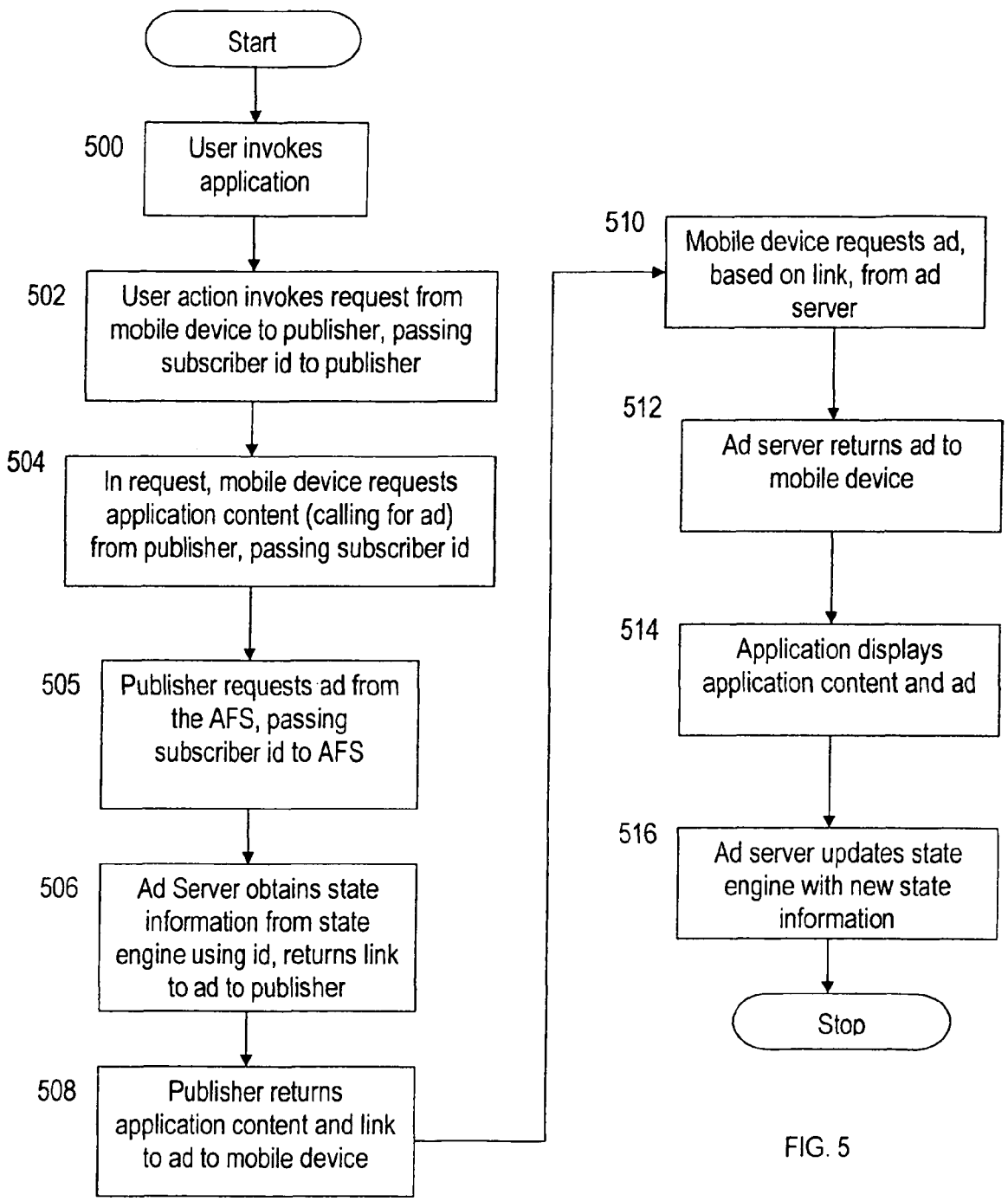
FIG. 5 is a flowchart of an illustrative process for serving advertisements in sequence based on state information in a server side state engine system according to various embodiments of the present disclosure.

Examples are illustrative as to how the method of FIG. 4 applies in various embodiments. FIG. 5 provides a flowchart of an illustrative process for serving advertisements in sequence based on state information in a server side state engine 132 (such as that shown in FIG. 2). The subscriber using the mobile device 104 invokes an application, such as opening the browser to a WAP page (block 500). User action taken by the subscriber, such as linking to a WAP page tagged for advertisements, invokes a request by the mobile device 104 to the publisher, and the unique subscriber identifier is passed (block 502). In various embodiments, the subscriber identifier is passed in an HTTP header.

In the request to the publisher, the mobile device 104 requests the content from the publisher that calls for the advertisement (block 504). The publisher then requests an advertisement from the advertisement fulfillment system 102, passing the subscriber identifier obtained from the mobile device 104 in the original request from the mobile device 104 (block 505). Based on the request from the publisher, the advertisement fulfillment system 102 obtains the state information from the state engine 132, utilizes the subscriber identifier (passed from the mobile device 104 to the ad fulfillment system 102 through the publisher) to select an advertisement, and returns a link to the advertisement to the publisher (block 506). For example, the state information may reflect that all the advertisements in the first stage of a campaign have been displayed, thus the advertisements from the next stage are appropriate selections. Likewise, the state information may reflect that the last advertisement displayed completed display of all advertisements for a given campaign, thus the advertisements from another campaign are appropriate selections. The state information may simply indicate that a next advertisement in a sequential order is the appropriate selection, in a simple round-robin style rotation. Then the publisher returns to the mobile device 104 the application content (i.e., the WAP page linked to) and the link to the selected advertisement (block 508). The mobile device 104 then requests the selected advertisement (for example, as part of the process of rendering a WAP page), based on the link, from the advertisement fulfillment system 102 in an HTTP request (block 510). In response to the request for the advertisement, the advertisement fulfillment system 102 returns the selected advertisement to the mobile device 104 (block 512).

In block 514, the application (the browser) displays the application content (the WAP page) and the advertisement (e.g., a banner ad displayed in a spot on the WAP page). When the advertisement has been conveyed for display in the application, the advertisement fulfillment system 102 updates the first state engine 132 with updated state information (block 516).

Figure 6:
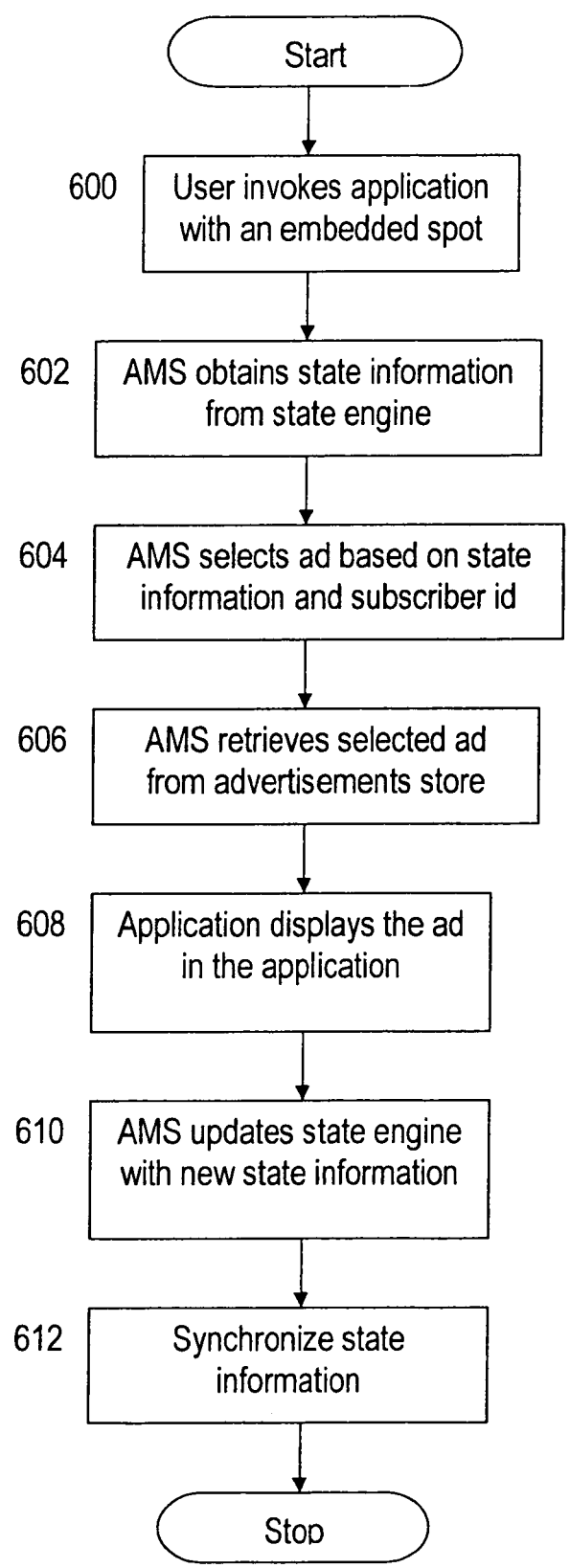
FIG. 6 is a flowchart of an illustrative process for serving advertisements in sequence based on state information in a client side state engine system according to various embodiments of the present disclosure.

FIG. 6 provides a flowchart of an illustrative process for serving advertisements in sequence based on state information in a client side state engine system (such as that shown in FIG. 3). The subscriber using the mobile device 104 invokes an application, such as initiating a JAVA application that displays an advertisement embedded in the JAVA, such as white space in a JAVA application game. (block 600). The advertisement management system 204 obtains the state information from the state engine 133 (block 602).

The advertisement management system 204 selects an advertisement to be displayed from the advertisements store 202 based on the state information, the subscriber identifier (block 604). The advertisement management system 204 retrieves the selected advertisement from the advertisements store 202 and returns it to the application (block 606).

The application then displays the selected advertisement in the application (block 608). When the advertisement has been displayed, the advertisement management system 204 updates the state engine 133 with new state information (block 610). Optionally, at some point in time, the advertisement management system 204 and the advertisement fulfillment system 102 synchronize the first state engine 132 and the second state engine 133 so that updated state information is mirrored in both locations (block 612).

The ability to track state information for subscribers enables advertisers to deliver a continuous media message across multiple media types in the wireless communication environment. Advertising across media types enables advertisers to tell a story across the multiple media types and leverage the strengths of each media type. State based advertising has many useful applications, examples of which are discussed here.

Targeted advertising takes place when advertisements are selected for display for a certain subscriber. For example, a subscriber may be targeted based on demographic information, such as data that the subscriber is female, in the age range from 18-25, and unmarried, along with subscriber information known to the carrier, such as that the subscriber most commonly uses the text messaging and directory applications/features of her mobile device. Advertisements may be targeted to her using media types for the applications she commonly uses for products for which she is in a target group. Targeted advertising is enhanced by the state based advertising of the present disclosure because the state information adds to the information known about the subscriber, and advertisements can be displayed to the subscriber based not only on the other targeting criteria, but also on what advertisements have already been displayed to her. For example, with the subscriber described above, adding to the demographic information and subscriber information known about her the knowledge that she has already had displayed to her a certain banner advertisement, the related advertisements for other media types could be served up to her the next time she invokes the pertinent applications. Furthermore, elements of a theme in a set of advertisements may be tailored to each media type, to best make use of the advantages of each media type.

Sequenced advertising takes place when advertisements are ordered in a fashion that presents a unified theme or tells a story. For example, a video clip may present advertising content with a theme, and a shorter video clip may follow that utilizes the same theme, characters, music, catch-phrases, and the like. This sequence is often used in television, with a long version of a commercial showing for a period of time, after which it is shortened to a brief clip to remind viewers of the full length commercial. The present disclosure improves upon sequenced advertising, however, in that subsequent advertisements are guaranteed to be presented only after the subscriber has viewed the primary advertisements. Moreover, additional media types may fit into the sequence based on state information, such as following video clips with banner advertisements in WAP pages using the theme, catch-phrases, and characters, SMS messages with the theme, catch-phrases and the like. Using embodiments of the present disclosure, state information may be used to track which advertisements and which media types in a sequence have been displayed, and based on that knowledge, different advertisements later in the sequence, or different media types for the sequence can be served up.

Sequencing across media types in this fashion increases the odds of successfully marketing to a subscriber that uses the mobile device in a certain way. That is, sequencing across the media types to reach a subscriber through the applications that he or she uses will be more effective than merely displaying an advertisement in a WAP page or a SMS message and hoping that a significant enough number of subscribers use the browser or SMS messaging features of the mobile device so as to effectively carry out an advertising campaign.

The state based advertising of the present disclosure still further enables forming dependencies between advertisements of varying media types to increase the effectiveness of a set or series of advertisements. A dependency rule may be set for sequenced advertisements, such as, not displaying an advertisement for a specific media type until at least a first advertisement of a specific media type has already been displayed. A stage of advertisement dependencies may be defined, for example, a WAP page that is not displayed unless and until a multi-media advertisement has been displayed, and the multi-media advertisement is not displayed unless and until a keyword is searched for in a search application, and the like. Setting up dependencies between advertisements and/or media types results in a foundation being laid for each successive displayed advertisement. The defined dependencies may be used to create customized campaigns, based on what has already been displayed in a particular mobile device.

The present disclosure enables advertising across media types in a unique fashion because carriers are in a unique position. Carriers control and limit access to mobile devices by advertisers, and accordingly they are in a unique position to sell advertising spots in all media types available in the mobile device, enabling full campaigns across media types. A campaign across media types in a mobile device adds more potential inventory for the advertiser from a single publisher (compared with different publishers for television, radio, print in magazines or newspapers, and the like).

Campaign analytics are improved by the present disclosure as well, in that the present disclosure provides for confirmation that an advertisement has been displayed. Likewise, for some media types, the present disclosure provides for confirmation of success of an advertisement, in the case of media types that elicit some responsive action from the subscriber when displayed. The effectiveness of a given advertising campaign may be measured at least in part based on actual knowledge of which advertisements were displayed, to whom, where, and whether any action was taken in response to the display.

FIG. 7 provides a table illustrating a number of campaign hierarchies for purposes of explaining some applications of the present disclosure. The first column provides a list of advertisers or specific items being advertised (either a consumer product, a brand or services, for example): a car manufacturer 700, a soda brand 702, and a food product/restaurant brand 704. The remaining columns each represent a stage in the campaign. Using state information, as described above, the advertiser may order, sequence or prioritize each advertisement in their advertising campaign according to the stages. The advertisements in stage 1 are displayed first. The number of impressions of each advertisement in the stage is displayed a predetermined number of times, according to the campaign parameters, before the advertisements in the next stage are displayed. Each advertiser may organize their campaign using the stage system, creating dependencies between various advertisements and various media types.

Advertisements implementing various media types (including those defined above) may be organized in the stages, including directory, location based services, WAP banners, Search, Games, Multimedia, JAVA, Alerts, Short Message Service, and Multimedia Message Service. Each advertiser may implement any number of advertisements of each type, or may choose not to use some of the media types.

For example, for a car manufacturer 700, a set of advertisements may exist, including for example two multi-media video clip advertisements for cars made by the car manufacturer 700, such as one truck video clip (Multi-media 1) and one sedan video clip (Multi-media 2). Similarly two banner advertisement for the cars for WAP pages may be provided, such as one truck banner (WAP banner 1) and one sedan banner WAP banner 2). A splash screen logo (JAVA 1) and a splash screen advertisement (JAVA 2) for the car that displays during loading of JAVA applications may also be implemented in the campaign. Other advertisements used may be messages, either text or multi-media, with a catch-phrase for the car sent (SMS 1) or (MMS 1). The advertiser may also use games to advertise the car—the car may appear in a game as either the car being driven in a racing game (Game 1) or a display on a billboard within the racing game (Game 2). In some embodiments, each advertisement in the campaign may have a common theme, music, appearance, catch-phrases, characters, and the like.

The advertisers who design the campaign may design a series of dependency rules between the various advertisements of the set. Such a dependency may order the advertisements such that any given one is not displayed before the advertisements it depends on have been displayed. The advertiser may use the same, similar, related or entirely different advertisements and/or media types from one stage to the next.

In the dependency organized in FIG. 7, for the car manufacturer 700 advertiser the first stage contains the Multi-media 1 advertisement which may be displayed three times before the second stage will be displayed. Stage 2 for the car manufacturer 700 advertiser contains Multi-media 1 advertisement, Multi-media 2 advertisement, and WAP banner 1 each of which may be displayed two times before the third stage will be displayed. Stage 3 for the car manufacturer 700 contains directory 1, Multi-media 2, WAP banner 1, WAP banner 2, Multi-media 1, JAVA 1, and JAVA 2, each of which may be displayed five times before the fourth stage will be displayed. Stage 4 for the car manufacturer contains SMS 1, MMS 1, Game 1, Game 2, and Directory 1, each of which may be displayed two times. When the Stage 4 advertisements have been displayed the predetermined number of times, the advertiser may elect to 1) carry out the campaign again with the same advertisements in the series of stages, 2) alter which advertisements are contained in the series of stages and/or re-order the series of stages, or 3) end the campaign. One aspect of the series of stages for the car manufacturer 700 is that advertisements may be placed prominently in often accessed spots, such as headline story media clips at a popular news website, in the earlier stages for display, and once the advertisements in often accessed spots have familiarized the subscriber with the theme or product, the latter stages may use more subtle placement, such as in the games or directory. The sequence arranged according to the dependency rules organizes an efficient campaign to make the most of the advantages of each media type, and unifies a theme across the media types.

In another example, a soda company may promote its brand 702 in a targeted campaign. The targeting criteria may be the demographic group that includes male and female college students, who, according to carrier information, at least use the browser and JAVA applications of their mobile devices. Knowing the targeted demographic and the technologies available for the media types that the target group may commonly utilize, the advertiser may design a storyboard advertisement across a package of spots utilizing several media types in the four stages. Furthermore, the advertiser may obtain information that confirms that the various portions of the story are actually displayed to the subscriber, and whether the subscriber responded to the display by, for example, clicking on an advertisement, using an electronic coupon, or the like.

The package of spots in the storyboard advertisement may be sequenced in order to tell a unified story, using a theme, and may be designed to reach the particular demographic group to whom it will be targeted. For example, a soda brand that is diet and non-caffeinated may be marketed to subscribers who are concerned about health, and a unifying theme may be about the fresh taste, no calories or caffeine. The story of the advertisements starts with advertisements in Stage 1 with one of two WAP page banners (WAP banner 1 and WAP banner 2), where the product is introduced as a more healthy soda and the subscriber may click a link to learn more about the product and receive coupons. The advertisements in Stage 1 are displayed five times to a given targeted subscriber before the advertisements in Stage 2 are displayed.

Stage 2 for the soda company 702 contains a multi-media video clip (Multi-media 1) that plays in a fashion similar to a television commercial when the subscriber opens the multi-media application, showing a brief clip with more facts about the new soda. Stage 2 for the soda company 702 may also contain splash screens for the logo of the company (JAVA 1) or catch-phrase for the soda brand campaign (JAVA 2) for display during loading of various Java applications. The advertisements in Stage 2 are displayed three times to a given targeted subscriber before the advertisements in Stage 3 are displayed.

Stage 3 for the soda company 702 contains a multi-media message (MMS 1) as a brief reminder. These brief reminder clips may be displayed to the subscriber in multi-media messages occasionally, to refresh the subscriber's memory and remind her about the product that she was interested in previously. Stage 3 also contains an additional splash screen for the name of the new soda (JAVA 3) that reminds the subscriber of the WAP banners that were previously displayed from Stage 1. Stage 3 additionally contains another multi-media video clip for display when the user plays video clips (Multi-media 2). As with television commercials, a second video clip may be a shorter, follow-on version of a longer clip that is shown previously. Stage 3 may also contain WAP banner 1, previously included in Stage 1, which is brought back and re-displayed in Stage 3 in order to remind the subscriber and renew interest. These advertisements in Stage 3 are displayed two times to the targeted subscriber before the advertisements in Stage 4 are displayed.

Stage 4 for the soda company 702 contains the multi-media message MMS 1 used in Stage 3 as well as a different multi-media message (MMS 2) for directly sending multi-media reminders to subscribers that are being actively targeted by the campaign. Multi-media messages are useful tools for notifying subscribers about special deals or pricing, new contests related to the product and the like, in order to draw in the subscriber who may have previously indicated some interest by viewing advertisements or clicking through on various advertisements from earlier stages. As a final reminder, Stage 4 may further contain alerts (alerts 1) about sales or coupons for the product may be displayed briefly in the subscriber's mobile device if she has exhibited interest in the product previously.

These advertisements in Stage 4 are displayed three times, after which the advertiser may elect to 1) carry out the campaign again with the same advertisements in the series of stages, 2) alter which advertisements are contained in the series of stages and/or re-order the series of stages, or 3) end the campaign. Given the state information stored regarding which advertisements were displayed and any action taken by subscribers in response to the advertisements, the advertiser may assess the success of the different advertisements and the efficacy of the various media types, and use the understanding gained from the state information to re-organize the campaign for future attempts at targeting campaigns or planning new campaigns.

In a third example, a food product from a restaurant 704 may be the subject of an advertising campaign across media types. Assume that the food product is a new spicy sandwich from a fast food restaurant that is popular with young people, and the food product is not on the "value menu" but occasionally goes on sale for a lower price during "special" hours, such as after-school. Some features of mobile devices that are popular with the young people who frequent the same type of restaurant include text messaging and multi-media features.

A campaign may be designed and sequenced to reach the targeted group of young people, using the media types that may be commonly used by the targeted group. A campaign may begin by targeting the demographic group that frequents the fast food restaurant.

Stage 1 for the restaurant 704 contains two location based advertisements (located based 1 and location based 2) that may be displayed as splash screens when a subscriber in the targeted demographic group is in the vicinity of the restaurant 704 after school to introduce the product to him. Stage 1 for the restaurant 704 may additionally include a WAP banner advertisement (WAP banner 1) showing the tasty sandwich and theme for the campaign may be displayed in a WAP page. These advertisements in Stage 1 are displayed four times to the targeted subscriber before the advertisements in Stage 2 are displayed.

Subsequently, alerts may be displayed to the subscriber who has had the Stage 1 advertisements displayed to him. Stage 2 contains alert 1 to inform the subscriber of the after school special lower price, during the after-school hours to entice him to the restaurant 704. Stage 2 additionally includes another WAP banner (WAP banner 2) that shows the hours and details of the special lower price for after-school hours. Stage 2 also contains the location based 2 advertisement previously used in Stage 1, in order to maintain an advertising presence on the subscriber's mobile device when he is within a certain vicinity of the restaurant 704. These advertisements in Stage 2 are displayed three times to the targeted subscriber before the advertisements in Stage 3 are displayed.

In Stage 3, SMS text messages (SMS 1 and SMS 2) may be sent to the subscriber, as well as other subscribers in the target demographic group, to inform about the new spicy sandwich and the special after-school hours price, in a media type that is popular with the demographic group. Stage 3 may also contain a multi-media video clip (multi-media 1), similar to a television commercial, to generate interest in the new product, in a media type that is popular with the demographic group, resulting in increased odds that the targeted subscribers will actually be reached by the advertisement. The advertisements in Stage 3 are displayed two times before the advertisements in Stage 3 are displayed.

Stage 4 includes several advertisements, including new advertisements not previously introduced by the earlier stages, as well as reusing advertisements that were included in the earlier stages. Stage 4 includes a second multi-media video clip (Multi-media 2) that advertises the special hours and prices for the new spicy sandwich special. Stage 4 reuses the WAP banner 1 from Stage 1 and the SMS 2 from Stage 3 to renew interest and remind the subscriber of what has been displayed to him before. Stage 4 also includes another WAP banner (WAP banner 3) which may, for example, offer an electronic coupon to the subscriber that may be redeemed at the restaurant 704. Stage 4 also includes search 1 such that when/if the subscriber opens the search feature and searches for "food," "fast food," or "restaurant," along with search results, the mobile device displays a brand logo, a splash screen or an advertisement for the new spicy sandwich and optionally, details on the nearest location of the restaurant 704. These advertisements are displayed four times before the advertiser may elect to adjust the campaign, run the campaign again as-is, or end the campaign.

This illustrative campaign for a new sandwich at a fast food restaurant 704, targeted to the young person demographic that frequents the restaurant, shows the improved targeting of advertisements based on state information, and the usefulness of sequencing based on state information.

In various embodiments, the advertisements from earlier stages may continue to be displayed once a later stage starts to be displayed. In other words, the earlier stages may "unlock" the later stages for display, but the earlier stage advertisements may continue to be displayed once the later stages are being used. Alternatively, the later stages may be in active response to the earlier stages.

Figure 8:
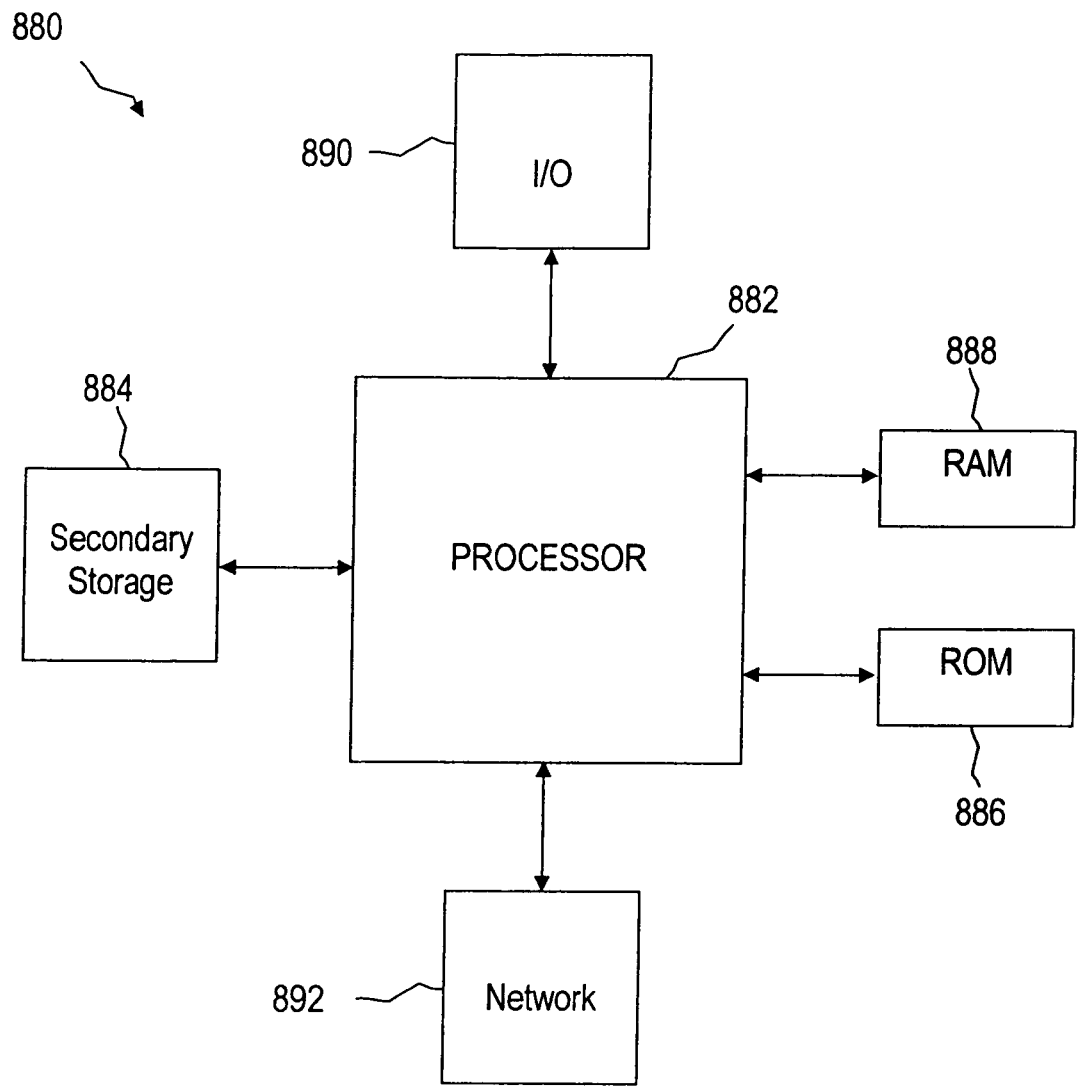
FIG. 8 shows an illustrative general purpose computer system suitable for implementing, at least in part, the several embodiments of the disclosure.

The dynamic content distribution and placement framework of the present disclosure may be implemented, at least partially, on any general-purpose computer(s) with sufficient processing power, memory resources, and network throughput capability to handle the necessary workload placed upon it, including a server. FIG. 8 illustrates a typical, general-purpose computer system suitable for implementing one or more embodiments disclosed herein. The computer system 880 includes a processor 882 (which may be referred to as a central processor unit or CPU) that is in communication with memory devices including secondary storage 884, reads only memory (ROM) 886, random access memory (RAM) 888, input/output (I/O) devices 890, and network connectivity devices 892. The processor may be implemented as one or more CPU chips.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are reads during program execution. ROM 886 is a non-volatile memory device which typically has a small memory capacity relative to the larger memory capacity of secondary storage. The RAM 888 is used to store volatile data and perhaps to store instructions. Access to both ROM 886 and RAM 888 is typically faster than to secondary storage 884.

I/O devices 890 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 892 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 892 may enable the processor 882 to communicate with an Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity devices 892 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method for state based advertisement messaging, comprising:

obtaining state information for a mobile device from a state engine, wherein the state information identifies an advertisement that has been presented in the mobile device, and wherein the state information identifies a media type of the advertisement that has been presented in the mobile device;

generating a plurality of dependency rules that specify an order to present a plurality of advertisements within an advertising campaign, wherein at least one of the dependency rules specifies an order of presentation of media types for the plurality of advertisements within the advertising campaign based on the media type of the advertisement that has been presented in the mobile device, and wherein at least one of the dependency rules specifies an order to present the advertisements such that the ordered advertisements present a unified theme;

selecting, by an advertising system, an advertisement from the plurality of advertisements within the advertising campaign, based at least in part on the state information satisfying at least one of the plurality of dependency rules;

presenting the selected advertisement in an application on the mobile device; and updating the state information for the mobile device when the selected advertisement has been presented in the application.

2. The method of claim 1, wherein the state information comprises a history of each advertisement comprising at least one of the dates the advertisement was presented, the times the advertisement was presented, how many times the advertisement has been presented, and action taken by a user of the mobile device in response to the advertisement.

3. The method of claim 1, wherein the plurality of advertisements comprise a plurality of media types.

4. The method of claim 1, further comprising:
targeting a particular mobile device with one or more advertisements in an advertising campaign based at least in part on state information relating to advertisements previously presented in that particular mobile device.

5. The method of claim 1, further comprising:
sequencing the order to present the plurality of advertisements such that when a first advertisement is presented in a first media type, the next time a second media type is invoked, a second advertisement related to the first advertisement is presented in the second media type.

6. The method of claim 1, further comprising:
planning an advertising campaign according to a plurality of stages, each stage containing at least one advertisement;
wherein at least some of the plurality of dependency rules specify the order to present the plurality of advertisements such that the at least one advertisement of a latter stage is not presented until the at least one advertisement of an earlier stage has been presented according to state information.

7. A system for state based advertisement messaging, comprising:
a mobile device served by an advertisement fulfillment system, the mobile device comprising:
a plurality of applications are executable to display advertisements of an advertising campaign in an order, wherein the advertisements of the advertising campaign comprise a plurality of media types; and
the advertisement fulfillment system comprising:
a first state engine that stores advertising state information for the mobile device, wherein the advertising state information comprises information identifying which of the advertisements of the advertising campaign have been previously displayed on the mobile device and information identifying a media type of each of the advertisements that have been previously displayed on the mobile device; and
a campaign execution unit that executes the advertising campaign by conveying the advertisements to the mobile device in the order based at least in part on the advertising state information for the mobile device, wherein the order is based on the media type of the advertisements that have been previously displayed on the mobile device, and wherein the order presents a unified theme.

8. The system of claim 7, wherein the mobile device further comprises:
an advertisements store that stores the plurality of advertisements of a plurality of media types; and
an advertisement management system that manages display of the advertisements stored in the advertisements store, wherein the advertisements are displayed in the order.

9. The system of claim 7, wherein the mobile device further comprises:
a second state engine that stores the state information for the individual mobile device; wherein the mobile device synchronizes the second state engine with the first state engine of the advertisement fulfillment system.

10. The system of claim 7, wherein the advertisement fulfillment system further comprises:
a user interface that receives user input for campaign design; and
a campaign planner that defines one or more advertising campaigns according to the user input and the state information.

11. The system of claim 7, wherein the state information comprises a history of each advertisement comprising at least one of the dates the advertisement was displayed, the times the advertisement was displayed, how many times the advertisement has been displayed, and action taken by a user of the mobile device in response to the advertisement.

12. The system of claim 11, wherein the mobile device initiates a request to the advertisement fulfillment system and the request conveys identifying information to cause the advertisement fulfillment system to select and convey the identity of an advertisement for display in the mobile device; and wherein the identity of the advertisement for display is used by the mobile device to display the advertisement.

13. The system of claim 11, wherein the advertisement fulfillment system updates the state information for each advertisement each time the advertisement is displayed.

14. A mobile device for state based advertisement messaging, comprising:
a state engine that stores state information for the mobile device, wherein the state information comprises information identifying a media type of the advertisement that has been previously presented in the mobile device; and
a plurality of executable applications that display a plurality of advertisements to a user in an order, wherein the order is based at least in part on state information, the order specifies an order of media types, and the order is chosen such that the ordering of the advertisements presents a unified theme.

15. The mobile device of claim 14, further comprising:
an advertisements store that stores the plurality of advertisements of a plurality of media types, wherein the advertisements are delivered from an external source; and
an advertisement management system that manages display of a plurality of advertisements across media types in the order, wherein the advertisement management system uses identifying information and state information to select one or more advertisements for display in the mobile device.

16. The mobile device of claim 15, wherein the advertisements are conveyed from the external source to the mobile device for display upon selection based on identifying information and state information.

17. The mobile device of claim 15, wherein the advertisements are stored in the advertisements store and displayed when identified as the next to display by the external source.

18. The mobile device of claim 15, wherein the mobile device initiates a request to the external source and the request conveys identifying information and state information to the external source to cause the external source to select one or more advertisements for display in the mobile device.

19. The mobile device of claim 18, wherein:
   the state information comprises a history of each advertisement comprising at least one of the dates the advertisement was displayed, the times the advertisement was displayed, how many times the advertisement has been displayed, and action taken by a user of the mobile device in response to the advertisement; and
   the identifying information comprises a subscriber identifier unique to the user of the mobile device inserted into the call by a gateway between the external source and the mobile device, and a device identifier unique to the type of the mobile device.

20. The mobile device of claim 14, wherein each time an advertisement is displayed to the user by an executable application, the mobile device updates the state information for the displayed advertisement in the state engine.

21. The mobile device of claim 15, wherein the state engine synchronizes the stored state information with other state information maintained by the external source.

* * * * *